United States Patent [19]

Miyazaki

[11] Patent Number: 4,539,266
[45] Date of Patent: Sep. 3, 1985

[54] MAGNETIC RECORDING MEDIUM

[75] Inventor: Takahiro Miyazaki, Miyagi, Japan

[73] Assignee: Sony Corporation, Tokyo, Japan

[21] Appl. No.: 673,729

[22] Filed: Nov. 21, 1984

[30] Foreign Application Priority Data

Nov. 30, 1983 [JP] Japan ................................ 58-226000

[51] Int. Cl.$^3$ ............................................... G11B 5/72
[52] U.S. Cl. ................................ 428/695; 252/62.54;
360/134; 360/135; 360/136; 427/128; 427/131;
428/694; 428/900
[58] Field of Search ...................... 427/128, 131, 132;
428/695, 694, 900, 411; 252/62.54;
360/134–136

[56] References Cited

U.S. PATENT DOCUMENTS

| 4,049,871 | 9/1977 | Ogawa | 428/423.7 |
| 4,201,809 | 5/1980 | Ogawa | 428/694 |
| 4,465,608 | 8/1984 | Gerüm | 252/62.54 |
| 4,497,864 | 2/1985 | Ryoke | 428/340 |

Primary Examiner—Ellis P. Robinson
Attorney, Agent, or Firm—Hill, Van Santen, Steadman & Simpson

[57] ABSTRACT

A magnetic recording medium such as magnetic tape or magnetic disc is disclosed in which a magnetic layer if formed on the non-magnetic base material and in which the fatty acid ester with diglycerol is contained as the lubricant.

The fatty acid ester with diglycerol employed as the lubricant is an ester of diglycerol with a saturated or unsaturated fatty acid with 8 to 22 carbon atoms.

10 Claims, 5 Drawing Figures

MAGNETIC RECORDING MEDIUM

BACKGROUND OF THE INVENTION

1. Field of the Invention

This invention relates to a magnetic recording medium having a magnetic layer on a non-magnetic base material. More particularly, it relates to a lubricant for the magnetic recording medium whereby improved running properties may be afforded to the magnetic recording medium.

2. Description of the Prior Art

The magnetic recording medium such as the magnetic tape is kept in perpetual contact with guide members or the magnetic heads during running. For this reason, the magnetic recording medium is required to have a low frictional coefficient and highly stable running characteristics. It is also required to be superior in wear resistance because it is in vigorous frictional contact with the guide members or magnetic heads with a high relative speed during recording and reproduction.

For improving the running properties or wear resistance of the magnetic recording medium, there has so far been known a method which consists in adding a lubricant to the magnetic layer, or forming a lubricant layer on the surface of the magnetic layer. The lubricant may generally include a solid lubricant such as molybdenum disulfide, graphite or wax, higher fatty acids, esters thereof with monohydric alcohols, or silicone oil.

With use of these lubricants, good running properties can be afforded to the magnetic recording medium. However, in this case, the other properties of the magnetic tape tend to be lowered. For example, the solid lubricant is not effective in improving the durability of the magnetic recording medium and, if used in excess amounts, may undesirably deteriorate its magnetic properties. On the other hand, the fatty acids etc. used as the lubricant are not only unable to impart sufficient lubricity to the magnetic recording medium but also may deteriorate its running properties through ageing. In addition, when added into the magnetic layer, the lubricant material may give rise to blooming which in turn may cause adherence or stick slip of the magnetic recording medium.

SUMMARY OF THE INVENTION

The present inventors have conducted researches into various lubricants capable of possibly affording good running properties to the magnetic recording medium without lowering its durability or magnetic properties. The present invention has been completed on the basis of our finding that the ester of the higher fatty acid with diglycerol is able to satisfy the above requirements and thus may be used advantageously as the lubricant for the magnetic recording medium.

According to one aspect of the present invention, there is provided a magnetic recording medium comprising a non-magnetic base material and a magnetic layer provided on one surface of said non-magnetic base material, in which the magnetic recording medium is provided with a layer containing a fatty acid ester with diglycerol.

With use of the ester of the higher fatty acid with diglycerol as the lubricant for the magnetic recording medium in accordance with the present invention, it is possible to provide a magnetic recording medium which not only is lower in frictional coefficient and thus shows smooth running properties but also free from post-ageing deterioration in the running properties or stick slip caused by prolonged usage and thus shows improved durability.

DESCRIPTION OF THE PREFERRED EMBODIMENTS

The present invention is characterized in that, in the magnetic recording medium having a magnetic layer on the non-magnetic base material, a fatty acid ester with diglycerol is contained and held in the magnetic recording medium.

The fatty acid ester with diglycerol is obtained by esterification reaction between a higher fatty acid and diglycerol as shown by the formulas below. Mono-, di-, tri- and tetraesters may be yielded depending on the number of the higher fatty acids that enter the esterification reaction.

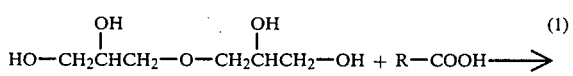

(1)

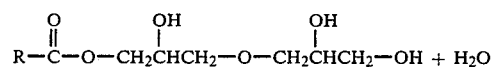

Where R represents a hydrocarbon residue with 7 to 21 carbon atoms;

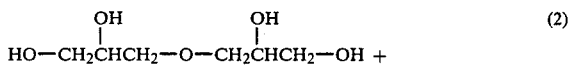

(2)

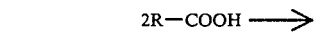

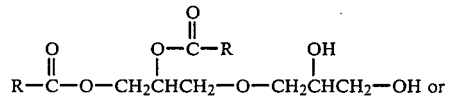

Where R has the same meaning as above;

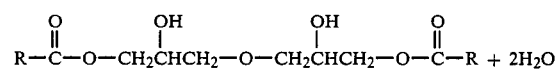

(3)

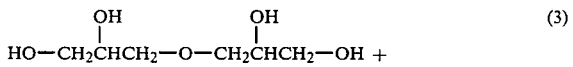

Where R has the same meaning as above;

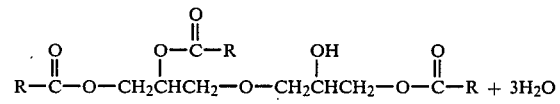

(4)

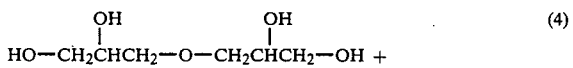

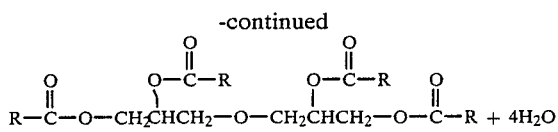

Where R has the same meaning as above.

Practically, any of these esters of the higher fatty acids with diglycerol may be used as the lubricant in the present invention. However, according to a finding of the present inventors, it is more preferred for improving frictional coefficient of the magnetic recording medium that some of the hydroxyl groups of diglycerol remain in the molecule without undergoing the esterification reaction.

The higher fatty acids used in the above esterification may be saturated or unsaturated fatty acids with 8 to 22 carbon atoms and the hydrocarbon part thereof may be in the form of straight chain groups with or without side chain or side chains. They may for example include saturated fatty acids, e.g., caprylic acid, capric acid, lauric acid, myristic acid, palmitic acid or stearic acid or unsaturated fatty acids, e.q., oleic acid, elaidic acid, linolic acid or linolenic acid.

When contained in the magnetic layer, the fatty acid ester with diglycerol in accordance with the present invention is preferably in the range of 0.2 to 4 weight parts to 100 weight parts of the magnetic powders in the magnetic layer. When contained in the back coat to be formed on the back surface of the base material, as described later, it may preferably be in the range of 0.2 to 20 weight parts to 100 weight parts of the binder contained in the back coat. Also, when a top coat or a coating layer consisting of the above described lubricant is to be coated or applied, as described later, the lubricant is preferably coated or applied in an amount of 1 to 1000 mg/m$^2$.

The structure of the magnetic recording medium of the present invention, such as the magnetic tape, is illustrated as an example in FIGS. 1 to 5.

Figure 1:
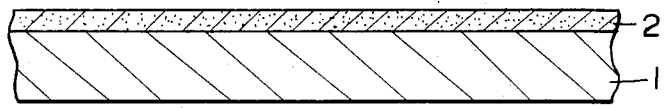
FIGS. 1 to 5 are cross-sectional views showing various examples of the magnetic recording medium according to the present invention.

In FIG. 1, there is shown a magnetic layer 2 containing the above described lubricant and applied to the front surface of the non-magnetic base material. In this and the other figures, the layer containing the above described lubricant is indicated in the drawings with the numerous dots.

Figure 2:
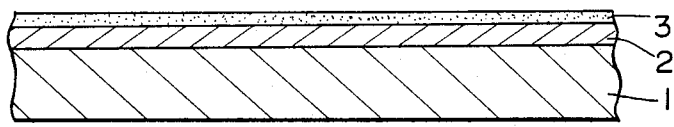
Figure 3:
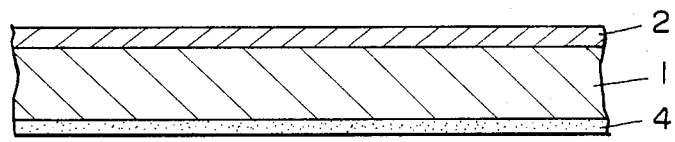
Figure 4:
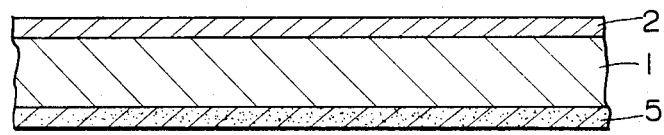
Figure 5:
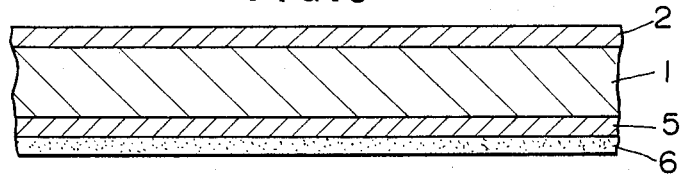

In FIG. 2, a top coat 3 consisting of the above described lubricant is shown to be formed on the front surface of the magnetic layer 2. In FIG. 3, a coating layer 4 consisting of the above described lubricant is shown to be formed on the rear surface of the non-magnetic base material 1. In FIG. 4, there is shown a back coat 5 formed on the rear surface of the non-magnetic base material 1 and containing the above described lubricant while, in FIG. 5, there is shown a coating layer 6 formed on the back coat 5 and consisting of the above described lubricant. It should be noted that the back coat 5 is used for various purposes, for example, for preventing static charges or adequately modifying the roughness of the backing surface of the base material 1 for providing more stable tape running. To this end, the back coat may be a mixture with the binder of carbon black or a non-magnetic paint such as alpha-Fe$_2$O$_3$, alumina, talcum or the like. The magnetic recording medium of the present invention may also be a magnetic disc presenting magnetic layers on both the front and rear surfaces thereof, besides the above described magnetic tape. Also the lubricant may be present in various places, as on the front and/or rear sides of the magnetic layer 2 or in the magnetic layer 2.

The magnetic powders that may be used in the above described magnetic layer may be enumerated by gamma-Fe$_2$O$_3$, Fe$_3$O$_4$, mixed crystals of gamma-Fe$_2$O$_3$, and Fe$_3$O$_4$, cobalt doped or absorbed gamma-Fe$_2$O$_3$, cobalt doped or adsorbed Fe$_3$O$_4$, CrO$_2$, barium ferrite, powders of various magnetic alloys such as Fe-Co, Co-Ni, Fe-Co-Ni, Fe-Co-B, Fe-Co-Cr-B, Mn-Bi, Mn-Al, Fe-Co-V, or the like, or iron nitride, these being used singly or as an admixture. The binder that may be used in the magnetic layer may be enumerated by vinyl chloride-vinyl acetate copolymer, vinyl chloride-vinyl acetate-vinyl alcohol copolymer, vinyl chloride-vinyl acetate-maleic acid copolymer, vinyl chloride-vinylidene chloride copolymer, vinyl chloride-acrylonitrile copolymer, acrylic acid ester-acrylonitrile copolymer, acrylic acid ester-vinylidene, chloride copolymer, methacrylic acid ester-vinylidene chloride copolymer, metacrylic acid ester-styrene copolymer, thermoplastic polyurethane resin, phenoxy resin, polyvinyl fluoride, vinylidene chloride-acrylonitrile copolymer, butadiene-acrylonitrile copolymer, acrylonitrile-butadiene-methacrylic acid copolymer, acrylonitrile-butadiene-acrylic acid copolymer, polyvinyl butyral, polyvinyl acetal, cellulose derivatives, styrene-butadiene copolymer, polyester resin, phenol resin, epoxy resin, thermohardening polyurethane resin, urea resin, melamine resin, alkyd resin and urea-formaldehyde resin.

The above magnetic powders and the binder are dispersed into organic solvents for the preparation of the magnetic paint. As such organic solvents, ketones such as acetone, methylethylketone, methylisobutylketone or cyclohexanone, alcohols such as methanol, ethanol, propanol or butanol, esters such as ethyl acetate, butyl acetate, ethyl lactate or glycol acetate monoethyl ether, glycol ethers such as ethylene glycol dimethyl ether, ethylene glycol monoethyl ether or dioxane, aromatic hydrocarbons such as benzene, toluene or xylene or nitropropane may be used singly or as an admixture. The magnetic paint thus prepared with use of these organic solvents is applied to the non-magnetic base material which may be formed of polyesters such as polyethylene terephthalate, polyolefins such as polypropyrene, cellulose derivatives such as cellulose triacetate or cellulose diacetate, polycarbonates, polyvinyl chloride, polyamides, polyimides or metals such as aluminium or steel. The above lubricant may be dissolved in low boiling solvents such as freon, hexane or ethanol for application as the top coat or the coating layer consisting essentially of the lubricant.

The magnetic recording medium in which the above described fatty acids esters with diglycerol may be used as the lubricant is not limited to the so-called coating type magnetic recording medium in which the mixture of the magnetic powders with the binder is coated on the base material for forming the magnetic layer, but may be applied to the ferromagnetic metal thin film type recording medium in which the ferro magnetic metal such as cobalt (Co), iron (Fe), nickel (Ni) or alloys thereof is formed on the non-magnetic base material as by plating, vacuum deposition, ion plating or sputtering. Because the binder is unnecessary to be used in the thin film tipe magnetic recording medium, an improvement is achieved in the magnetic flux density. In addition, because the recording medium may be of an extremely reduced thickness, it can be used efficiently for short wavelength and high density recording.

The description with reference to certain specific examples of the present invention are given hereinbelow. It should however be noted that these examples are given only by way of illustration and are not intended for limiting the scope of the present invention.

EXAMPLE 1

The following composition for the magnetic paint was prepared.

Co-adsorbed gamma-$Fe_2O_3$: 100 wt. parts
Vinyl-chloride-vinyl acetate copolymer (manufactured by U.C.C., VAGH): 15.5 wt. parts
Urethane resin (manufactured by Nippon Polyurethane KK, under the designation of N-5033): 6.5 wt. parts
Carbon (antistatic agent): 5 wt. parts
Lecitin (dispersant): 1 wt. parts
Oleic acid ester with diglycerol (equivalent to diester): 1 wt. parts
Methylethylketone: 150 wt. parts
Methylisobutylketone: 150 wt. parts The above composition was mixed in a ball mill for 24 hours and filtered. To the resulting mixture were added 4 weight parts of "Coronate L" (a curing agent manufactured by Nippon Polyurethane KK) prior to application as coating, and the resulting mixture was stirred for 30 minutes. The resulting magnetic paint was applied on a 12 micron thick polyethylene terephthalate base to give a coating having a dry thickness of 5 microns. The base thus coated was subjected to magnetic orientation and the resulting film was taken up on a spool. The film was then calendered and cut into a ½ inch wide sample tape.

That the oleic acid ester with diglycerol was equivalent to diester was inferred from the amount of the hydroxyl remaining in diglycerol. This applies to each of the following Examples as well.

EXAMPLE 2

A sample tape was prepared by following the procedures of the Example 1 with the exception that the isostearic acid ester with diglycerol (equivalent to diester) was used in place of the oleic acid ester with diglycerol (equivalent to diester) in the composition of the magnetic paint of the Example 1.

EXAMPLE 3

A sample tape was prepared by following the procedures of the Example 1 with the exception that 1.5 weight parts of the myristic acid ester with diglycerol (equivalent to triester) was used in place of 1.5 weight parts of oleic acid ester with diglycerol (equivalent to diester) in the composition of the magnetic paint of the Example 1.

COMPARATIVE EXAMPLE

The following composition for the magnetic paint was prepared.

Co-adsorbed gamma-$Fe_2O_3$ 100 wt. parts
Vinyl chloride-vinyl acetate copolymer (manufactured by U.C.C. Inc., VAGH): 15.5 wt. parts
Polyurethane resin (manufactured by Nippon Polyurethane KK, under the designation of N-5033) 6.5 wt. parts
Carbon: 5 wt. parts
Lecitin: 1 wt. parts
Methylethylketone: 150 wt. parts
Methylisobutylketone: 150 wt. parts A sample tape was prepared from the above composition and by following the procedure of the Example 1.

EXAMPLE 4

A sample tape was prepared by coating (as top coat) a solution in n-hexane of 1.5 weight percent of the oleic acid ester with diglycerol (equivalent to diester) on the magnetic layer of the sample tape obtained in accordance with the Comparative Example, in such a manner that the amount of coating of the isostearic acid ester with diglycerol was equal to 80 mg/$m^3$.

EXAMPLE 6

A sample tape was prepared by coating (as top coat) a solution in n-hexane of 1.5 weight percent of the isostearic acid ester with diglycerol (equivalent to triester) on the magnetic layer of the sample tape obtained in accordance with the Comparative Example, in such a manner that the amount of coating of the isostearic acid ester with diglycerol was equal to 80 mg/$cm^2$.

EXAMPLE 7

A sample tape was prepared by coating (as top coat) a solution in n-hexane of 1.5 weight percent of the isostearic acid ester with diglycerol (equivalent to tetraester) on the magnetic layer of the sample tape obtained in accordance with the Comparative Example, in such a manner that the isostearic acid ester with diglycerol was applied in an amount of 80 mg/$cm^2$.

The various properties of the sample tapes prepared in accordance with the above Example and the Comparative Example are shown in the Table below.

TABLE

|  | Pre-ageing | | Post-ageing | |
| --- | --- | --- | --- | --- |
|  | frict. coeff. | stick slip | frict. coeff. | stick slip |
| EX. 1 | 0.21 | o | 0.22 | o |
| 2 | 0.24 | o | 0.22 | o |
| 3 | 0.26 | Δ- o | 0.27 | Δ- o |
| 4 | 0.21 | o | 0.23 | o |
| 5 | 0.23 | o | 0.22 | o |
| 6 | 0.25 | Δ- o | 0.23 | Δ- o |
| 7 | 0.33 | Δ | 0.33 | Δ |
| COM. EX | 0.50 | x | 0.49 | x |

In the Table, the marks o, Δ and x for the stick slip indicate good, poor and unacceptable properties, respectively. The ageing process was continued for three days at a temperature of 40° C. and a relative humidity of 80 percent.

It is seen from the above Table that the magnetic recording medium according to the present invention shows an extremely small frictional coefficient and acceptable running properties, while being free from stick slip. Above all, it is apparent that the recording medium of the present invention is also free from the post-ageing deterioration in the running properties.

What is claimed is:

1. A magnetic recording medium comprising a non-magnetic base and a magnetic layer provided on one surface of said non-magnetic base, in which said magnetic recording medium is provided with a layer containing a fatty acid ester with diglycerol.

2. A magnetic recording medium according to claim 1, wherein said fatty acid ester with diglycerol is contained in said magnetic layer.

3. A magnetic recording medium according to claim 1, wherein said fatty acid ester with diglycerol is contained in a layer provided over a surface of said magnetic layer.

4. A magnetic recording medium according to claim 1, wherein said fatty acid ester with diglycerol is contained in a layer provided on a surface opposite to said surface of the non-magnetic base on which said magnetic layer is formed.

5. A magnetic recording medium according to claim 1, wherein said fatty acid ester with diglycerol is contained in a back coat provided on a surface opposite to said surface of said non-magnetic base on which said magnetic layer is formed.

6. A magnetic recording medium according to claim 1, wherein said fatty acid ester with diglycerol is contained in a layer provided on a surface of said back coat.

7. A magnetic recording medium according to claim 1, wherein the fatty acid is a saturated fatty acid having 8 to 22 carbon atoms.

8. A magnetic recording medium according to claim 1, wherein the fatty acid is an unsaturated fatty acid having 8 to 22 carbon atoms.

9. A magnetic recording medium according to claim 1, wherein said magnetic layer is composed of binder and magnetic powder.

10. A magnetic recording medium according to claim 1, wherein said magnetic layer is composed of ferromagnetic metal thin film.

* * * * *